United States Patent [19]

Takeda

[11] Patent Number: 4,931,958

[45] Date of Patent: Jun. 5, 1990

[54] DISPLAY SYSTEM WITH FEWER DISPLAY MEMORY CHIPS

[75] Inventor: Susumu Takeda, Kasugai, Japan

[73] Assignee: Brother Kogyo Kabushiki Kaisha, Aichi, Japan

[21] Appl. No.: 135,323

[22] Filed: Dec. 21, 1987

[30] Foreign Application Priority Data

Dec. 29, 1986 [JP] Japan .................. 61-314361

[51] Int. Cl.⁵ .............................. G06F 12/02
[52] U.S. Cl. .................... 364/521; 340/799
[58] Field of Search ........ 340/798, 799, 789; 364/200 MS File, 900 MS File, 518, 521

[56] References Cited

U.S. PATENT DOCUMENTS

| | | | |
|---|---|---|---|
| 4,298,931 | 11/1981 | Tachiuchi et al. | 364/200 |
| 4,462,028 | 7/1984 | Ryan et al. | 340/799 |
| 4,468,662 | 8/1984 | Tanaka | 340/789 |
| 4,663,619 | 5/1987 | Staggs et al. | 340/799 X |

Primary Examiner—David L. Clark
Attorney, Agent, or Firm—Oliff & Berridge

[57] ABSTRACT

For reducing the number of display data RAM chips to designate one pattern of a character pattern ROM which contains patterns of a large number of characters and needs a large number of bits to be designated, a clock signal whose cycle time is the same or less than the updating cycle time of the designating address data of the display data RAM is employed to address the display data RAM. Conventionally, the data of the display data RAM to designate the character pattern ROM is stored separately in different chips when the data length (bit number) becomes large. But, according to the present invention, the data is stored separately in one chip.

3 Claims, 3 Drawing Sheets

DISPLAY SYSTEM WITH FEWER DISPLAY MEMORY CHIPS

BACKGROUND OF THE INVENTION

1. Field of the invention

This invention relates to a display system used in computer systems or the like which displays characters on a display, e.g. CRT or LCD.

2. Prior art

Conventional display systems include character pattern ROM, display data RAM, a display controller (CRT controller) and a display device (CRT). The character pattern ROM contains pattern data of a plurality of characters each of which corresponds to a character code. When a character code is input into the character pattern ROM, the corresponding character pattern is output from the character pattern ROM to the display device via a display signal processor. The display data RAM stores a plurality of character codes constituting the display screen which is to be displayed on the display device. The data in the display data RAM can be changed to produce a change in the display screen. The display controller outputs an address of the display data RAM to the display data RAM, which outputs a character code at the address to the character pattern ROM to be displayed on the display device.

For outputting specific character pattern data from the ROM, the RAM should be constituted so as to be able to specify each character pattern data stored in the ROM. That means, the display data RAM should store and output data that can discriminate between the many character pattern data stored in the ROM. For example, if the ROM has a capacity of 32 kbit (4 k x 8 bit), 12 bit data is necessary to address each character pattern of the character pattern ROM. If a display data RAM of 8 bit output is employed, two display data RAMs are necessary at one time to address the character pattern ROM.

Therefore, when the number of pattern data stored in the character pattern ROM is increased and the number of bits needed to address the character pattern ROM is accordingly increased, the necessary number of display data RAMs is also increased. This results in complicated circuitry and a circuit board of large area. Further, such results lead to an increased vulnerability of the circuit board to static electric noise and AC line noise.

Another display system includes a RAM that stores attribute information (such as underline) besides character codes. In this system, the pattern data outputted from the ROM is combined with the attribute to be displayed on the display device. In such a system, the number of bits outputted from the RAM is further increased and more RAM's are accordingly required.

SUMMARY OF THE INVENTION

Accordingly, an object of the invention is to provide a display system in which the necessary character codes are output to the character pattern ROM by a smaller number of RAM chips. Another object is, accordingly, to reduce the number of display data RAM chips and to make the display circuit simpler and less affected by electro-static noise or AC line noise. These and other objects are achieved by the display system of the invention for reducing the number of display memory chips comprising:

- pattern data storing means for storing pattern data of a plurality of characters and for outputting the pattern data of a character to a display responsive to a code data of the character;
- display data storing means for storing a plurality of character code data to be displayed on the display;
- display control means for outputting an address data having a predetermined number of bits to the display data storing means so that the display data storing means output the character code data corresponding to the address data to the pattern data storing means, the address data being updated at a predetermined cycle time;
- address modification means for adding one or more bits to the address data and for outputting the added address data to the display data storing means, the bit or bits being updated at a cycle time which is a division of the predetermined cycle time; and
- character code holding means for temporarily holding the character code data outputted from the display data storing means at every time the bit or bits added to the address data are updated and for outputting all the character code data held therein to the pattern data storing means when the predetermined cycle time has elapsed.

The address data outputted from the display control means is updated at the predetermined cycle time. The bit or bits added to the address data change their states at a cycle time which is a division of the predetermined address updating cycle time. Therefore, the display data storing means outputs different character code data or attribute data every time the bit or bits change their states. The different character code data or attribute data are temporarily held in the character code holding means and when one cycle time of the predetermined cycle has elapsed, all the held data in the character code holding means is outputted to the pattern data storing means. Therefore, the data to be outputted to the pattern data storing means can be stored in the display data storing means in divided form. This means that the display data storing means, the output bit number of which is less than the bit number necessary to designate a character of the pattern data storing means, can be employed.

BRIEF EXPLANATION OF THE DRAWINGS

The invention may be best understood by referring to the following description of the preferred embodiment and the drawings in which.

DETAILED DESCRIPTION OF THE EMBODIMENT

Figure 2:
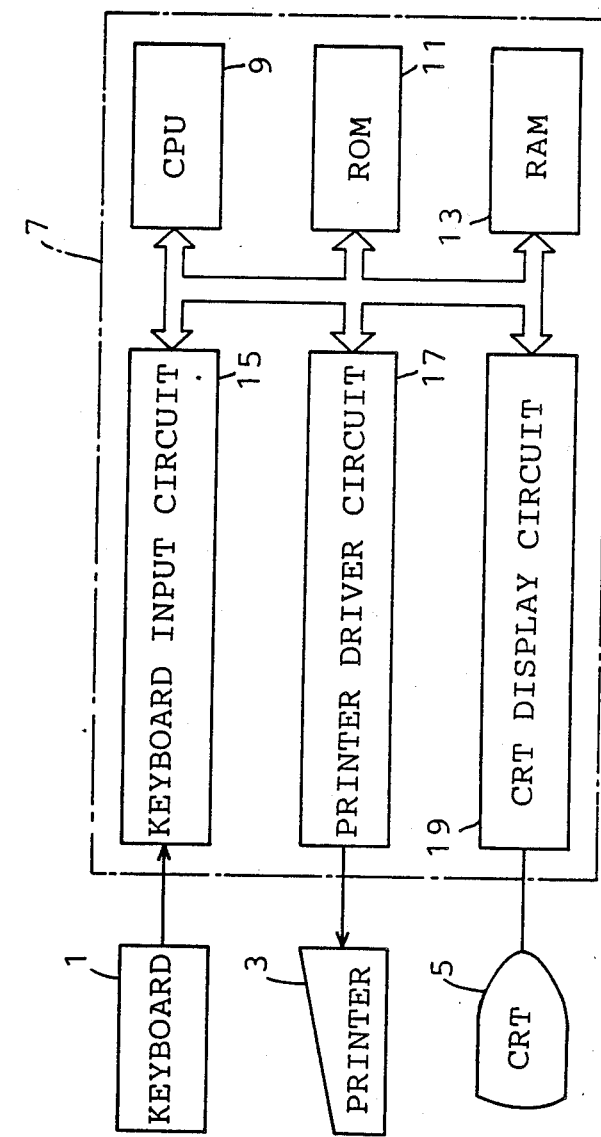
FIG. 2 is a structural block diagram of a word processor of the embodiment.

The present invention is embodied in a word processor. As shown in FIG. 2, a word processor of the embodiment includes a keyboard 1, printer 3, CRT 5 and an electronic control unit 7. The electronic control unit 7 is connected to the keyboard 1, printer 3 and CRT 5; and it executes processings including inputting, editing, displaying and printing of text. The electronic control unit 7 is constructed as a logical circuit equipped with:

CPU 9 which executes the above processings; ROM 11 which stores both control programs for performing the above processings and various preset data; RAM 13 which stores text data and temporary data necessary for the control of the processings; a keyboard input circuit 15 which is connected to the keyboard 1; a printer driver circuit 17 which is connected to the printer 3; and a CRT display circuit 19 which is connected to the CRT display 5.

Figure 1:
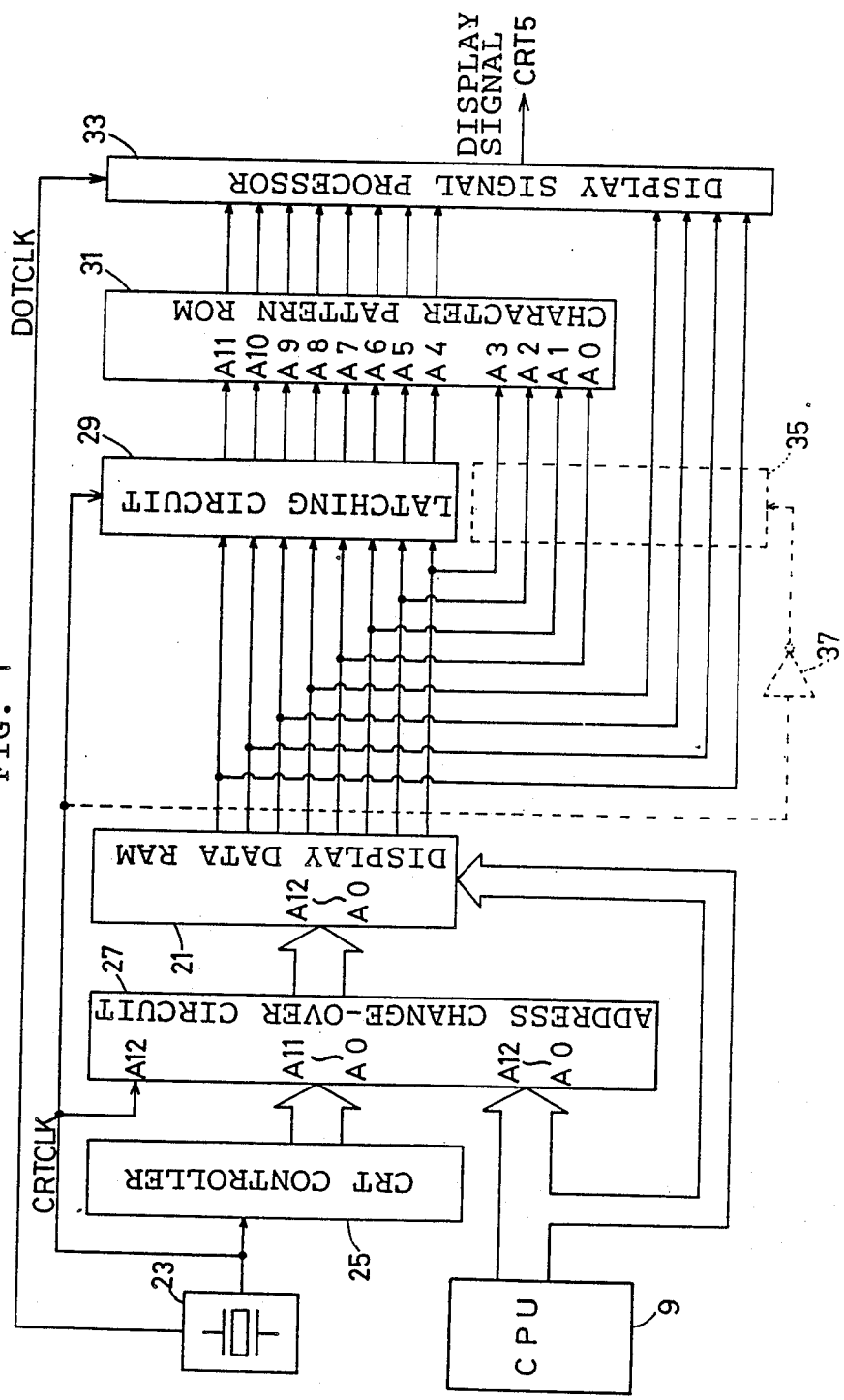
FIG. 1 is a block diagram of a CRT display circuit of an embodiment of the invention.

As shown in FIG. 1, the CRT display circuit 19 includes: display data RAM 21 which stores data to be displayed on the CRT 5; and a CRT controller 25 which outputs address data that is updated by CRTCLK signals outputted from a clock signal generator circuit 23 to the display data RAM 21, and makes the display data RAM 21 output the corresponding display data. By this system, independent of the CPU 9, data stored in the display data RAM 21 is displayed on the CRT 5. On the line from the CRT controller 25 to the display data RAM 21 is provided an address signal change-over circuit 27 which switches the address signal inputted into the display data RAM 21 from that from the CRT controller 25 to that from the CPU 9. When the CPU 9 outputs address data to the display data RAM 21, the signal change-over circuit 27 switches the input source from the CRT controller 25 to the CPU 9, and outputs the address data from the CPU 9 to the display data RAM 21. Therefore, when an item of the display on the CRT 5 is to be changed, the CPU 9 designates a specific address of the display data RAM 21 to rewrite the data item at the specific address.

Figure 3:
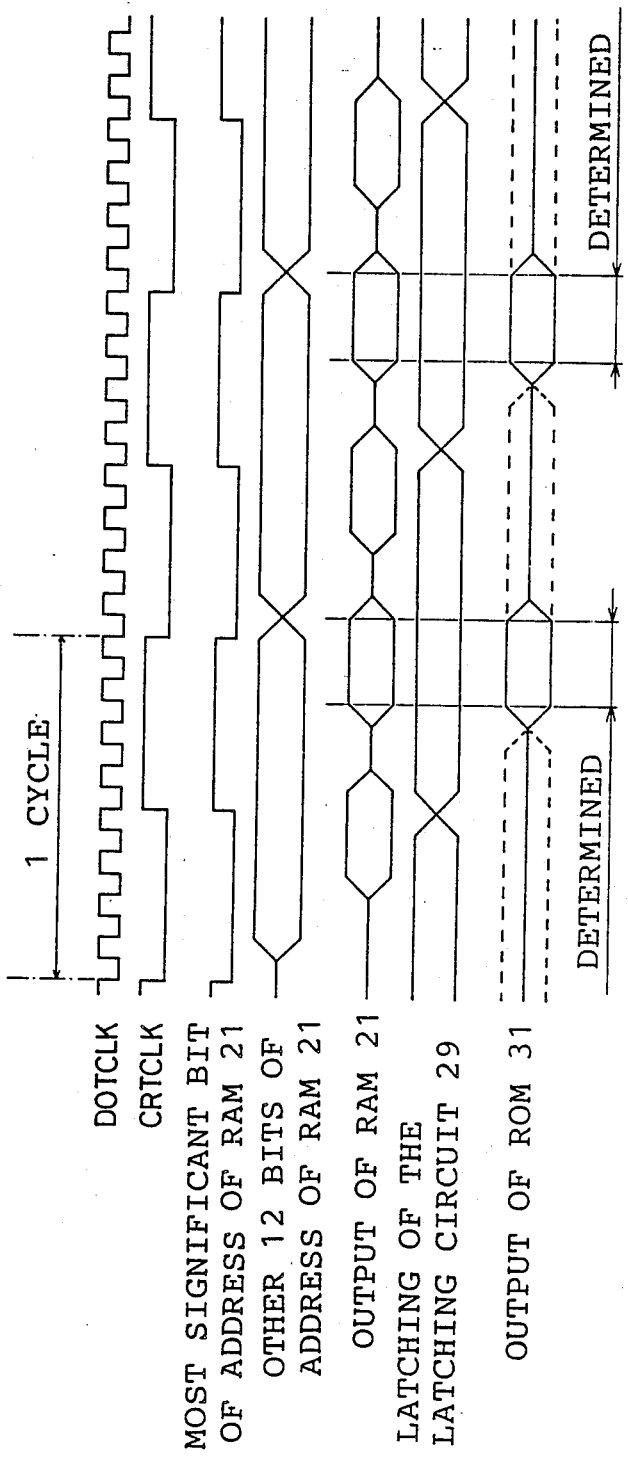
FIG. 3 is a timing chart of the embodiment.

In this embodiment, the number of bits needed to fully address the display data RAM 21 is 13 (A0 to A12). But the CRT controller outputs only 12 bits of address data (A0 to A11) to the display data RAM 21 and the most significant bit (A12) is inputted into the display data RAM 21 from the clock circuit 23. Namely, the most significant bit of the address data is provided by the CRTCLK signal (shown in FIG. 1). As the cycle time of the CRTCLK signal is the same as the updating cycle time of the address data to the display data RAM 21 (i.e. the CRTCLK signal changes state twice during the address updating cycle time), the predetermined address data inputted into the display data RAM 21 is updated at half the updating cycle of the address data from the CRT controller 25. That means, as shown in FIG. 3, that the display data RAM 21 outputs two kinds of display data in one cycle of the CRTCLK signal. In this embodiment, a latching circuit 29 is provided between the display data RAM 21 and a character pattern ROM 31. The latching circuit 29 temporarily holds the first received of two display data for a half cycle of the CRTCLK signal and simultaneously outputs both the first display data and the second display data to the character pattern ROM 31 at the latter half cycle of the CRTCLK signal. This latching circuit is of course operated on the CRTCLK signal timing delivered from the clock circuit 23.

The display data RAM 21 is an 8 bit RAM and the character pattern ROM 31 is a 32 kbit (4 k x 8 bit) ROM in this embodiment. Since the display data RAM 21 outputs two display data per cycle of the CRTCLK signal which constitutes 16 bit data, the 16 bit length of the display data exceeds that of the number of bits needed to designate the full address of the character pattern ROM 31 (12 bits in this case). But in the display data RAM 21, one display data is composed of 12 bits of character code to designate the character pattern of the ROM 31 and 4 bits of character attribute (such as an underline). Therefore, the 16 bits of data outputted from the display data RAM 21 are utilized without loss and the memory space of the display data RAM 21 is fully utilized.

When both the first 8 bit data stored in the latching circuit 29 and 4 bit data among the second 8 bit data outputted from the display data RAM 21 are inputted together into the character pattern ROM 31, the code of the character to be displayed on the CRT 5 is determined (as shown in FIG. 3). When the character code is determined, the character pattern data is outputted from the character pattern ROM 31 to a display signal processor 33. The attribute data outputted from the display data RAM 21 is also inputted into the display signal processor 33. In the display signal processor 33, the character pattern from the character pattern ROM 31 and the attribute data from the display data RAM 21 are integrated and converted into a display signal for display on the CRT 5 in accordance with the timing of DOTCLK signal outputted from the clock circuit 23. The DOTCLK signal is for counting timing for outputting dots constituting a character on the CRT 5. As shown in FIG. 3, 8 dots constitute a horizontal line of a character.

As described above, address data for designating the display data RAM 21 is constituted by both the address data outputted from the CRT controller 25 and the CRTCLK signal. Therefore, two kinds of data are outputted from the display data RAM 21 in one cycle of the CRTCLK clock signal, and the two data are combined to represent one character code to designate a character pattern in the character pattern ROM 31. This enables a display data (character code, or character code plus attribute data) to be divided into two parts, and to be stored in different places within one chip of RAM. Namely, different RAM chips are not needed to designate a character pattern ROM at one time.

While it takes some time from the time when a character code is inputted into the character pattern ROM 31 to the time when the corresponding character pattern is outputted from the character pattern ROM 31, another latching circuit 35 may be added between the display data RAM 21 and the character pattern ROM 31 or display signal processor 33 (i.e. on the data line conducting the second half of the outputted data), as shown by the broken line of FIG. 1. The CRTCLK signal is inputted into the latching circuit 35 via an inverter 37. In this case, as shown by the broken line of FIG. 3, the length of determined state of the character code data inputted into the character pattern ROM 31 becomes longer, assuring less troublesome character display.

Obviously, many modifications and variations of the present invention are possible in the light of above teachings. It is therefore to be understood that within the scope of the appended claims, the invention may be practiced otherwise than as specifically described. For example, the display data RAM 21 receives only one bit from the CRTCLK signal which has a cycle time the same as the updating cycle time of the address data outputted from the CRT controller. This enables the display data RAM 21 to output two kinds of data in one updating cycle of the address data from the CRT controller, since the CRTCLK signal has two states per cycle. Therefore, it is apparent that four kinds of data can be outputted from the display data RAM 21 in one updating cycle of the address data from the CRT controller 25 by inputting two clock lines, one having the same cycle time as the updating cycle time and the other having half of the updating cycle time, in the A12 and A11 terminals of the display data RAM 21. In this case, three latching circuits will be needed to hold the preceding three character code data outputted from the display data RAM 21.

What is claimed is:

1. A display system for reducing a number of display memory chips comprising:
    pattern data storing means for storing pattern data of a plurality of characters and for outputting the pattern data of a character to a display responsive to a code data of the character;
    display data sorting means for storing a plurality of character code data to be displayed on the display;
    display control means for outputting address data having a predetermined number of bits, the address data being updated at a predetermined cycle time;
    address modification means for concatenating one or more bits from a clock signal to the address data and for outputting the concatenated address data to the display data storing means so that the display data storing means outputs the character code data corresponding to the address data to the pattern data storing means and to a character code holding means, the bit or bits being updated at a cycle time which is a division of the predetermined cycle time; and
    said character code holding means temporarily holding the character code data outputted from the display data sorting means every time the address data are updated and outputting all the character code data held therein to the pattern data storing means when the predetermined cycle time has elasped.

2. The display system according to claim 1 wherein the pattern data storing means is a character pattern ROM, the display data storing means is a display data RAM, display control means is a CRT controller, the bit concatenated at the address modification means is the clock signal generated by a clock signal generator whose cycle time is half the predetermined cycle time for updating the address data, the character code holding means is a latching circuit provided between the display data RAM and the character pattern ROM and receiving the clock signal for temporarily holding a first half of a character code data outputted from the display data RAM.

3. The display system according to claim 2 wherein the display system comprises a second latching circuit provided between the display data RAM and the character pattern ROM, the second latching circuit receiving a signal which is an inversion of the clock signal in order to temporarily hold a second half of the character code data outputted from the display data RAM.

* * * * *